United States Patent [19]

Hilfman et al.

[11] 3,920,581

[45] Nov. 18, 1975

[54] METHOD OF PREPARING A HYDRODESULFURIZATION CATALYST

[75] Inventors: Lee Hilfman, Mount Prospect; Edward Michalko, Chicago, both of Ill.

[73] Assignee: Universal Oil Products Company, Des Plaines, Ill.

[22] Filed: May 18, 1973

[21] Appl. No.: 361,685

[52] U.S. Cl............... 252/448; 252/465; 252/466 J; 208/216
[51] Int. Cl............................................. B01j 11/22
[58] Field of Search......... 252/448, 466 J, 470, 465; 208/216

[56] References Cited
UNITED STATES PATENTS

| | | | |
|---|---|---|---|
| 2,880,171 | 3/1959 | Flinn et al. | 252/466 J |
| 2,963,449 | 12/1960 | Nixon | 252/448 X |
| 3,075,915 | 1/1963 | Arnold et al. | 252/466 J |

FOREIGN PATENTS OR APPLICATIONS

| | | | |
|---|---|---|---|
| 533,529 | 11/1956 | Canada | 252/448 |

*Primary Examiner*—W. J. Shine
*Attorney, Agent, or Firm*—James R. Hoatson, Jr.; Robert W. Welch; William H. Page, II

[57] ABSTRACT

A catalytic composite comprising a Group VIB and a Group VIII metal composited with an alumina support or carrier material. A catalytic composite particularly useful as a hydrodesulfurization catalyst results from the method of preparation. Basic aluminum sulfate and a Group VIII metal compound are dissolved in an aluminum chloride hydrosol followed by a mixture of a Group VIB metal compound and an aqueous urea-hexamethylenetetramine solution. The resulting hydrosol is formed into spheroidal gel particles by the oil drop method.

8 Claims, No Drawings

METHOD OF PREPARING A HYDRODESULFURIZATION CATALYST

This invention relates to a catalytic composite particularly useful in the hydrodesulfurization of petroleum hydrocarbon fractions such as residual fuel oils. It has become well known that oxides of sulfur, plus lesser amounts of other sulfurous compounds, are among the major pollutants of the atmosphere. It has been estimated that, in this country alone, in excess of about 23 million tons of sulfur dioxide has been discharged into the atmosphere on an annual basis. The increasingly deleterious effect of the sulfurous pollutants with respect to cardiorespiratory disease, eye irritation, and the like, has prompted rather severe legislative action to control the amount of sulfur dioxide discharged into the atmosphere, particularly in densely populated areas where the problem is more acute. It has been recognized that the combustion of petroleum products accounts for a substantial portion of said oxides of sulfur and legislation has been effected or proposed which is particularly directed to the limitation of sulfurous compounds in residual fuel oils to be burned in densely populated areas. The supply of residual fuel oils of suitable sulfur content is entirely inadequate to meet present day requirements and it becomes increasingly important to develop improved hydrodesulfurization techniques to treat the more accessible and abundant residual fuel oils of relatively high sulfur content.

Desulfurization technology is presently concerned with hydrotreating and to the development of catalysts that are more selective and/or operate at less severe conditions to obviate hydrocracking of the residual fuel oil. Hyrdotreating or hydrodesulfurization is generally effected at hydrodesulfurization reaction conditions including an imposed hydrogen pressure of from about 100 to about 3,000 pounds per square inch. Normally the hydrogen is charged together with recycle hydrogen to provide from about 1,000 to about 50,000 standard cubic feet per barrel of hydrocarbon charge. Hydrodesulfurization reaction conditions further include an elevated temperature, usually from about 200° to about 800° F., although temperatures in the higher range, say from about 600° to about 800° F., are most suitable. Also, a sulfur-containing feed stock is generally suitably processed at a liquid hourly space velocity of from about 0.5 to about 20. Hydrodesulfurization catalysts preferably comprise a Group VIB metal, usually molybdenum, and a Group VIII metal, usually nickel and/or cobalt, on a refractory inorganic oxide carrier material, usually alumina.

It is an object of this invention to present an improved hydrodesulfurization catalyst characterized by a novel method of manufacture.

In one of its broad aspects, the present invention relates to a catalytic composite of from about 5 to about 20 wt. % Group VIB metal and from about 0.1 to about 10 wt. % Group VIII metal composited with an alumina carrier material, and embodies a method of preparation which comprises commingling aluminum sulfate and ammonium hydroxide in aqueous solution at a pH of from about 5.5 to about 6.5 and precipitating a basic aluminum sulfate; dissolving said basic aluminum sulfate and a soluble Group VIII compound in an aluminum chloride hydrosol having an aluminum/chloride weight ratio of from about 0.9:1 to about 1.4:1; admixing a soluble Group VIB metal compound with an aqueous solution of urea and hexamethylenetetramine, and dissolving the mixture in the hydrosol; dispersing the hydrosol as droplets in a hot oil bath effecting gelation of the hydrosol; aging the resulting hydrogel spheres at a temperature effecting decomposition of the residual urea and hexamethylenetetramine contained therein, and washing, drying and calcining the aged spheres.

Other objects and embodiments of this invention will become apparent in the following detailed specification.

In the course of manufacturing the catalytic composite of this invention, a basic aluminum sulfate and a Group VIII metal compound are dissolved in an aluminum chloride hydrosol. The basic aluminum sulfate therein contemplated is substantially as described in U.S. Pat. No. 3,027,234. Thus, the basic aluminum sulfate employed is prepared by commingling aluminum sulfate and ammonium hydroxide in aqueous solution at a pH of from about 5.5 to about 6.5. The basic aluminum sulfate which precipitates at the described pH conditions can be represented by the formula $Al_2O_3(SO_3)_{0.5-0.45}$. The basic aluminum sulfate is thus characterized by a $SO_3/Al_2O_3$ ratio of from about 0.5 to about 0.45. One suitable method of commingling the aluminum sulfate and ammonium hydroxide in aqueous solution is to charge the aluminum sulfate and ammonium hydroxide solutions separately and simultaneously to a common reaction vessel in a ratio to maintain the pH of the resulting common solution at from about 5.5 to about 6.5. The reaction vessel should embody means for controlling the individual charge rates, and also adequate mixing means, and means for continuously monitoring the pH of the stirred solution or mixture. The aluminum sulfate and ammonium hydroxide solutions are readily metered to the reaction vessel in concentrations ranging from 15 to about 30%, although other concentrations can be utilized.

The aluminum chloride hydrosol, variously referred to as an aluminum oxychloride hydrosol, aluminum hydroxychloride hydrosol, and the like, is such as is prepared by the general method whereby aluminum chloride is hydrolyzed in aqueous solution and the chloride anion concentration of the solution subsequently substantially reduced, as by neutralization, to promote olation and formation of inorganic polymers of colloidal dimension dispersed and suspended in the remaining liquid. A particularly suitable method of preparation involves the use of aluminum metal as a neutralizing agent in conjunction with an aqueous aluminum chloride solution. In this instance, the salt of neutralization is itself a hydrolyzable aluminum salt subject to ultimate sol formation. One convenient and preferred method of preparing the aluminum chloride hydrosol comprises digesting aluminum pellets in aqueous hydrochloric acid at about reflux temperature — usually from about 175° to about 220° F., and reducing the chloride anion concentration of the resulting aluminum chloride solution by the device of maintaining an excess of the aluminum reactant in the reaction mixture as a neutralizing agent. In any case, the aluminum chloride hydrosol is prepared to contain aluminum and chloride in a ratio of from about 0.9:1 to about 1.4:1.

The amount of basic aluminum sulfate dissolved in the aluminum chloride hydrosol should be sufficient to provide from about 25 to about 75 wt. % of the aluminum content, and consequently from about 25 to about 75 wt. % of the alumina content, of the final catalytic composite. The basic aluminum sulfate is suitably dissolved in the aluminum chloride hydrosol at a temperature of from about 120° to about 300° F. with a temperature in the upper range of from about 175° to about 300° F. being preferred.

The Group VIII metal compound is suitably, although not necessarily, dissolved in the aluminum chloride hydrosol together with the basic aluminum sulfate. In one preferred embodiment of this invention, the Group VIII metal component of the catalytic composite is cobalt, and cobalt nitrate hexahydrate is a particularly suitable cobalt compound dissolvable in the aluminum chloride hydrosol. Other Group VIII metal components, i.e., iron, nickel, platinum, palladium, ruthenium, rhodium, osmium and iridium, may be included in the catalytic composite by dissolving a suitable compound thereof in the aluminum chloride hydrosol. Suitable Group VIII metal compounds include such a nickel nitrate, nickel chloride, nickel sulfate, nickel acetate, cobaltous nitrate, cobaltous sulfate, ferric nitrate, ferric sulfate, ferric chloride, platinum chloride, chloroplatinic acid, palladium chloride, chloropalladic acid, rhodium chloride, ruthenium chloride, osmium dioxide, iridium tetrachloride, and the like. In any case, the amount of Group VIII metal compound dissolved in the aluminum chloride hydrosol should be sufficient to provide a final catalyst composite containing from about 0.1 to about 10 wt. % Group VIII metal.

In accordance with the present invention a soluble Group VIB metal compound is admixed with an aqueous solution of urea and hexamethylenetetramine and the mixture dissolved in the Group VIII metal-containing hydrosol. It is a primary function of the urea to stabilize the hydrosol, particularly in the presence of hexamethylenetetramine, and obviate premature gelation, and the urea-hexamethylenetetramine combination subsequently serves as an ammonia precursor to facilitate neutralization and setting of the hydrosol upon being dispersed as droplets in a hot oil bath at a temperature effecting hydrolysis and/or decomposition of the urea and hexamethylenetetramine, suitably a temperature of from about 120° to about 220° F. Addition of the Group VIB metal compound in admixture with the urea-hexamethylenetetramine solution has been found to effect a better distribution of the Group VIB metal component in the catalytic composite. In any case, the urea is suitably effective in from about a 1:1 to about a 5:1 mole ratio with the hexamethylenetetramine, the optimum ratio increasing in the range of from about 1:1 to about 5:1 with increasing amounts of basic aluminum sulfate employed.

In one preferred embodiment, the Group VIB metal component is molybdenum, and molybdenum trioxide is a preferred molybdenum compound for dissolution and/or suspension in the hydrosol together with the aqueous urea and hexamethylenetetramine solution. Other Group VIB metal components, i.e., chromium and tungsten, can be included in the catalytic composite utilizing, for example, such compounds as ammonium chromate, ammonium peroxychromate, chromium acetate, chromous chloride, chromium nitrate, ammonium metatungstate, tungstic acid, etc. Other molybdenum compounds which are suitable include ammonium molybdate, ammonium paramolybdate, molybdic acid and the like. The amount of Group VIB metal compound utilized is sufficient to provide a final catalytic composite containing from about 5 to about 20 wt. % Group VIB metal.

The Group VIB and Group VIII metals-containing hydrosol is further treated in accordance with the oil drop method whereby the hydrosol is dispersed as droplets in a hot oil bath and gelation occurs with the formation of firm hydrogel particles. The spheroidal hydrogel particles are typically retained and aged in the hot oil bath or forming oil whereby desirable pore characteristics of the spheroidal gel product are established. Only a fraction of the urea-hexamethylenetetramine is hydrolyzed or decomposed in the relatively short period during which initial gelation occurs with the formation of spheroidal hydrogel particles. During the subsequent aging process, the residual urea and hexamethylenetetramine retained in the hydrogel particles continues to hydrolyze and effect further polymerization of the alumina hydrogel whereby improved desirable pore characteristics are established. The urea-hexamethylenetetramine combination is utilized in an amount to provide, upon total hydrolysis and/or decomposition to ammonia, from about 110 to about 200% neutralization of the chloride and sulfate acid anion content of the hydrosol. Aging of the hydrogel is suitably accomplished over a period of from about 10 to about 24 hours, preferably in the oil suspending medium at a temperature of from about 140° to about 320° F. or more, and at a pressure to maintain the water content of the hydrogen spheres in a substantially liquid phase.

After the aging treatment, the spheres are washed in any suitable manner. A particularly satisfactory method is to wash the spheres by percolation, either with an upward or downward flow of water, and preferably with water containing a small amount of ammonium hydroxide and/or ammonium carbonate. After washing, the spheres are dried at a temperature of from about 200° to about 600° F. or dried at this temperature and calcined at a temperature of from about 600° to about 1400° F. for 2 to 12 hours or more in an oxidizing atmosphere, thereby thermally decomposing the Group VIB and Group VIII metal compounds, other than molybdenum trioxide, to metal oxides.

The following examples are comparative examples presented in illustration of the improvement realized utilizing the catalyst and method of preparation of the present invention, and the examples thus presented are not intended as an undue limitation on the generally broad scope of the invention as set out in the appended claims.

EXAMPLE I

A catalyst "A" was prepared in accordance with the method of this invention. In the preparation, about 3 milliliters of a 28% aqueous aluminum sulfate solution was admixed with 50 milliliters of water and the pH adjusted to 6 by the addition thereto of a 28% aqueous ammonium hydroxide solution. Further quantities of the aqueous aluminum sulfate and ammonium hydroxide solutions were added simultaneously to the stirred reaction mixture in a ratio and at a rate to maintain the pH of the reaction mixture at 6, the aluminum sulfate solution being added at about 1200 milliliters per hour and the ammonium hydroxide solution at about 400 milliliters per hour until 8.8 liters of the aluminum sulfate solution had been added. The resulting basic aluminum sulfate was separated by filtration. A portion of the basic aluminum sulfate containing the equivalent of 20 grams of aluminum was then digested, together with 3.3 grams of cobalt nitrate hexahydrate, in an aluminum chloride hydrosol containing the equivalent of 10 grams of aluminum. The digestion was effected at about 212° F. over a 5 hour period. The aluminum chloride hydrosol had been prepared by charging 20 grams of aluminum pellets to a digestor followed by 86.5 grams of treated water and thereafter by the slow addition of 41.6 grams of concentrated hydrochloric acid. The reaction mixture was stirred at 215° F. until the aluminum digestion was substantially complete as evidenced by the evolution of approximately 2.2 grams of hydrogen. The resulting aluminum chloride hydrosol contained 13.75 wt. % aluminum in a 1.3:1 weight ratio with the chloride content thereof. The cobalt-containing basic aluminum sulfate-aluminum chloride hydrosol was cooled to about 42°–44° F. and 5.5 grams of molybdenum trioxide in admixture with an aqueous solution of 37 grams of urea and 11 grams of hexamethylenetetramine was added thereto with stirring. The mixture was then emitted as droplets into a gas oil suspending medium maintained at about 195° F. with the formation of spheroidal gel particles. The spheroidal gel particles were aged for about 1 hour in the hot forming oil at 60 psig, and thereafter washed, dried and calcined in air for 1 hour at 650° F. and 2 hours at 1,250° F. The finished catalyst contained 2 wt. % cobalt, and 12 wt. % molybdenum composited with 1/16″ alumina spheres.

EXAMPLE II

A catalyst "B" was prepared and utilized as a comparative example with catalyst "A." Basic aluminum sulfate, containing the equivalent of 20 grams of aluminum, was digested in an aluminum chloride hydrosol containing the equivalent of 10 grams of aluminum. The basic aluminum sulfate and the aluminum chloride hydrosol were prepared as heretofore described in Example I. The basic aluminum sulfate-aluminum chloride hydrosol was cooled to 42°–44° F. and admixed with an equal volume of an aqueous solution containing 37 grams of urea and 11 grams of hexamethylenetetramine. Alumina hydrogel spheres were formed by the described oil drop method, aged for about 20 hours in the hot forming oil, and washed, dried and calcined in air for 1 hour at 650° F. and 2 hours at 1,250° F. The calcined alumina spheres were impregnated with 2 wt. % cobalt and 14 wt. % molybdenum. Impregnation was by means of an impregnating solution prepared by dissolving cobalt carbonate and molybdic acid in a common aqueous ammonical solution. The alumina spheres were immersed in the solution and soaked for about 10 minutes at ambient temperature. The solution was thereafter evaporated to dryness in contact with the spheres utilizing a rotary steam dryer. The impregnated spheres containing 2 wt. % cobalt and 14 wt. % molybdenum were subsequently dried and calcined in air for 1 hour at 1,095° F.

EXAMPLE III

A catalyst "C" was prepared utilizing an aluminum chloride hydrosol prepared as described in Example I. The hydrosol was admixed with 57 grams of a 28% aqueous hexamethylenetetramine solution, the mixture being maintained at 42°–44° F. Alumina hydrogel spheres were formed by the described oil drop method, aged for about 20 hours in the hot oil and thereafter washed, dried and calcined for about 1 hour at 650° F. and 2 hours at 1,250° F. the calcined alumina spheres were impregnated with 2 wt. % cobalt and 14 wt. % molybdenum substantially as described in Example II, and the impregnated spheres subsequently dried and calcined in air for about 1 hour at 1,095° F.

Each of the catalysts thus prepared were similarly evaluated with respect to the hydrodesulfurization of a reduced crude oil with an API at 60° F. of 13.1 and containing 3.38 wt. % sulfur. The reduced crude was passed in contact with the catalyst in a fixed bed under 2,000 psig hydrogen pressure. Hydrogen, including hydrogen recycled through a caustic scrubber, was charged in admixture with the reduced crude at the rate of 5,000 standard cubic feet per barrel of hydrocarbon charge, the reduced crude being charged at a liquid hourly space velocity of about 1.2 The catalyst bed temperature was adjusted upwardly periodically as required to control the sulfur level of the hydrotreated product at about 1 wt. %.

Comparative data, including the initial and final catalyst temperature required to control the sulfur level of the hydrotreated product at about 1 wt. % while processing a given quantity of reduced crude, is tabulated below:

| Catalyst | A | B | C |
| --- | --- | --- | --- |
| Cat. Temp., initial-final, °F. | 700–725 | 710–740 | 710–745 |
| Total Hydrocarbon chg., BBLS | 2.9 | 2.9 | 1.3 |
| Deactivation rate, °F./BBL/LB/ | 10 | 14 | 27 |

The improvement resulting from use of the catalyst of this invention (A) is evident with reference to the rate of deactivation expressed in terms of °F. per barrel of reduced crude charge stock per pound of catalyst.

Thus, a preferred embodiment of the present invention resides in a catalytic composite of from about 5 to about 20 wt. % molybdenum and from about 0.1 to about 10 wt. % cobalt composited with a carrier material, said composite having been prepared by commingling aluminum sulfate and ammonium hydroxide in aqueous solution at a pH of from about 5.5 to about 6.5 and precipitating a basic aluminum sulfate; dissolving said basic aluminum sulfate and cobalt nitrate hexahydrate in an aluminum chloride hydrosol having an aluminum/chloride ratio of from about 0.9:1 to about 1.4:1, said basic aluminum sulfate being utilized in an amount to provide from about 25 to about 75 wt. % of the alumina component of the catalytic composite; admixing molybdenum trioxide with an aqueous solution containing urea and hexamethylenetetramine in a mole ratio of from about 1:1 to about 5:1, and dissolving the mixture in the cobalt-containing hydrosol, the urea-hexamethylenetetramine being utilized in an amount to effect from about 110% to about 200% neutralization of the chloride-sulfate acid anion content of said hydrosol, and dispersing the mixture as droplets in a hot oil bath; aging the resulting hydrogel spheres in said oil bath at a temperature of from about 140° to about 220° F., and washing, drying and calcining the aged spheres.

We claim as our invention:

1. A method of preparing a catalytic composite of from about 5 to about 20 wt.% Group VIB metal in oxide form and from about 0.1 to about 10 wt. % Group VIII metal in oxide form composited with an alumina carrier material, comprising:

a. commingling aluminum sulfate and ammonium hydroxide in aqueous solution at a pH of from about 5.5 to about 6.5 precipitating a basic aluminum sulfate;

b. dissolving said basic aluminum sulfate and a soluble Group VIII metal compound thermally decomposable to metal oxide in an aluminum chloride hydrosol having an aluminum/chloride weight ratio of from about 0.9:1 to about 1.4:1;

c. admixing molybdenum trioxide or a soluble Group VIB metal compound thermally decomposable to metal oxide with an aqueous solution of urea and hexamethylenetetramine, and dissolving the mixture in the hydrosol;

d. dispersing the hydrosol as droplets in a hot oil bath effecting gelation of the hydrosol;

e. aging the resulting hydrogel spheres at a temperature effecting decomposition of the residual urea and hexamethylenetetramine contained therein, and washing, drying and calcining the aged spheres.

2. The method of claim 1 further characterized with respect to step (b) in that said basic aluminum sulfate is utilized in an amount to provide from about 25 to about 75 wt. % of the alumina component of the final catalytic composite.

3. The method of claim 1 further characterized with respect to step (b) in that said Group VIII metal compound is a compound of cobalt.

4. The method of claim 1 further characterized with respect to step (b) in that said Group VIII metal compound is cobalt nitrate hexahydrate.

5. The method of claim 1 further characterized with respect to step (c) in that said Group VIB metal compound is a compound of molybdenum.

6. The method of claim 1 further characterized with respect to step (c) in that molybdenum trioxide is admixed in said step.

7. The method of claim 1 further characterized with respect to step (c) in that said urea and hexamethylenetetramine are employed in a mole ratio of from about 1:1 to about 5:1 and in a total amount to effect from about 110 to about 200% neutralization of the chloride and sulfate acid anion content of the hydrosol upon total decomposition.

8. The method of claim 6 further characterized in that said Group VIII metal compound is a cobalt compound.

* * * * *